United States Patent [19]

Johnson et al.

[11] 4,040,498
[45] Aug. 9, 1977

[54] INSECT SHIELD ASSEMBLY

[75] Inventors: James B. Johnson; Jesse L. Henson, both of Urbana, Ohio

[73] Assignee: W. B. Marvin Mfg. Co., Urbana, Ohio

[21] Appl. No.: 629,376

[22] Filed: Nov. 6, 1975

[51] Int. Cl.² .................................................. B60K 11/02
[52] U.S. Cl. ............................. 180/68 P; 224/42.03 R; 296/91
[58] Field of Search ................. 180/68 P; 296/91, 15; 280/502; 224/42.03 B, 42.03 A, 42.03 R; 160/DIG. 1, DIG. 2

[56] References Cited

U.S. PATENT DOCUMENTS

| 1,863,428 | 6/1932 | Westrick | 160/DIG. 2 |
| 2,067,639 | 1/1937 | Lett | 180/68 P |
| 2,778,439 | 1/1957 | Pfingsten | 180/68 P |
| 2,792,254 | 5/1957 | Hagglund | 180/68 P |
| 2,868,308 | 1/1959 | Biewald | 180/68 P |
| 2,872,242 | 2/1959 | Whartman et al. | 180/68 P |
| 3,815,700 | 6/1974 | Mittendorf | 180/68 P |
| 3,831,696 | 8/1974 | Mittendorf et al. | 180/68 P |
| 3,863,728 | 2/1975 | Mittendorf | 180/68 P |

FOREIGN PATENT DOCUMENTS

| 632,464 | 12/1961 | Canada | 180/68 P |
| 1,126,263 | 3/1962 | Germany | 180/68 P |
| 148,378 | 1/1955 | Sweden | 224/42.03 B |

OTHER PUBLICATIONS

"Bike Carrier-Assembly Instructions" 9620 and 9621, Apr. 2, 1974, All American Products Inc., Chicago, Ill.

Primary Examiner—Robert R. Song
Assistant Examiner—David M. Mitchell
Attorney, Agent, or Firm—Dybrig & Dybrig

[57] ABSTRACT

An insect shield assembly for protecting the front end of a moving vehicle from insects is disclosed which includes two relatively rigid panels with mesh screening connected together to span across the entire front of the vehicle. A windshield deflector is made from flexible plastic film or sheet overlying the upper portion of the screening. A shield mounting system is provided which includes tubular members attached to and bracing the panels and which are slidably received within cooperating tubular members mounted on the vehicle.

6 Claims, 6 Drawing Figures

U.S. Patent  Aug. 9, 1977  Sheet 1 of 2  4,040,498
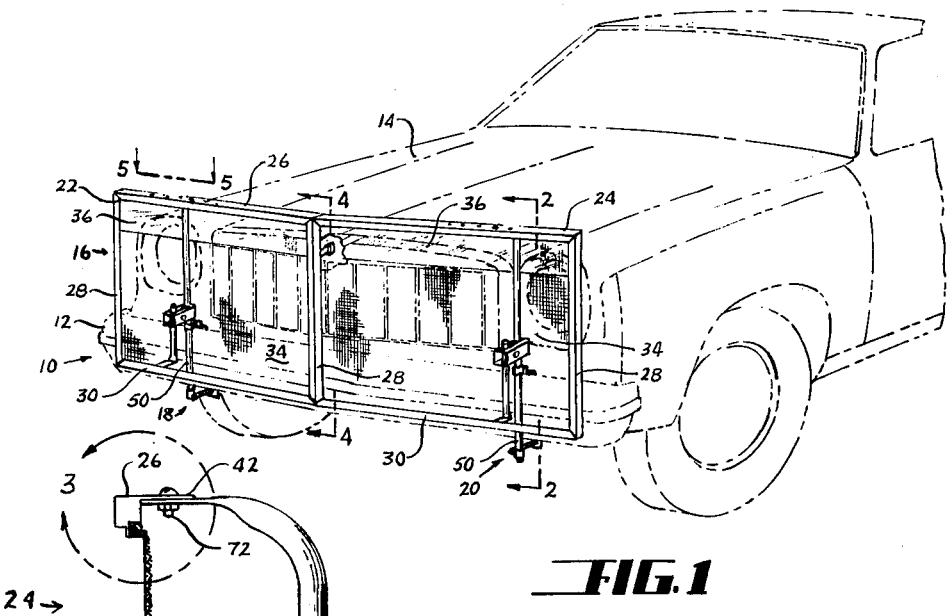
FIG.1
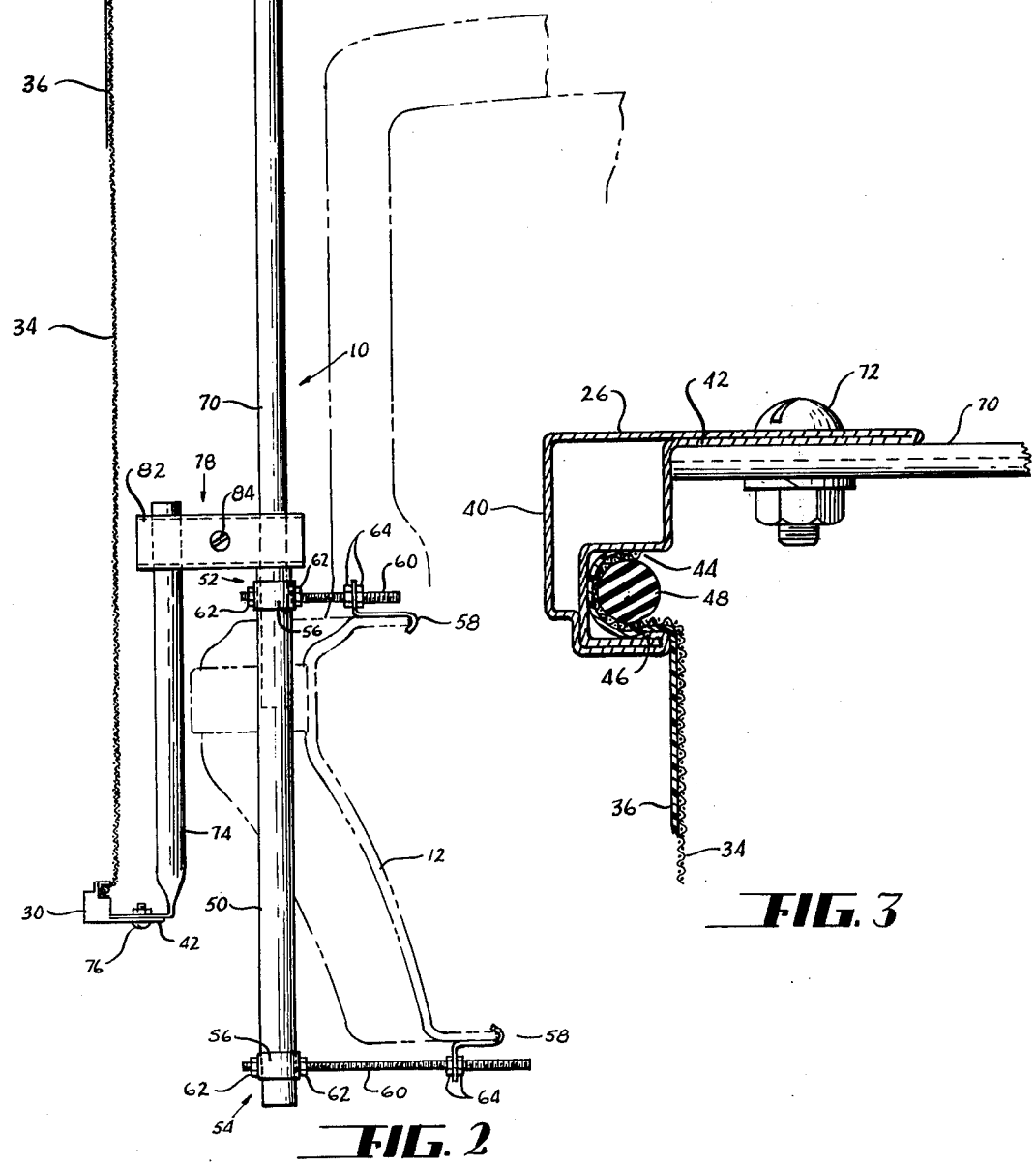
FIG. 2
FIG. 3

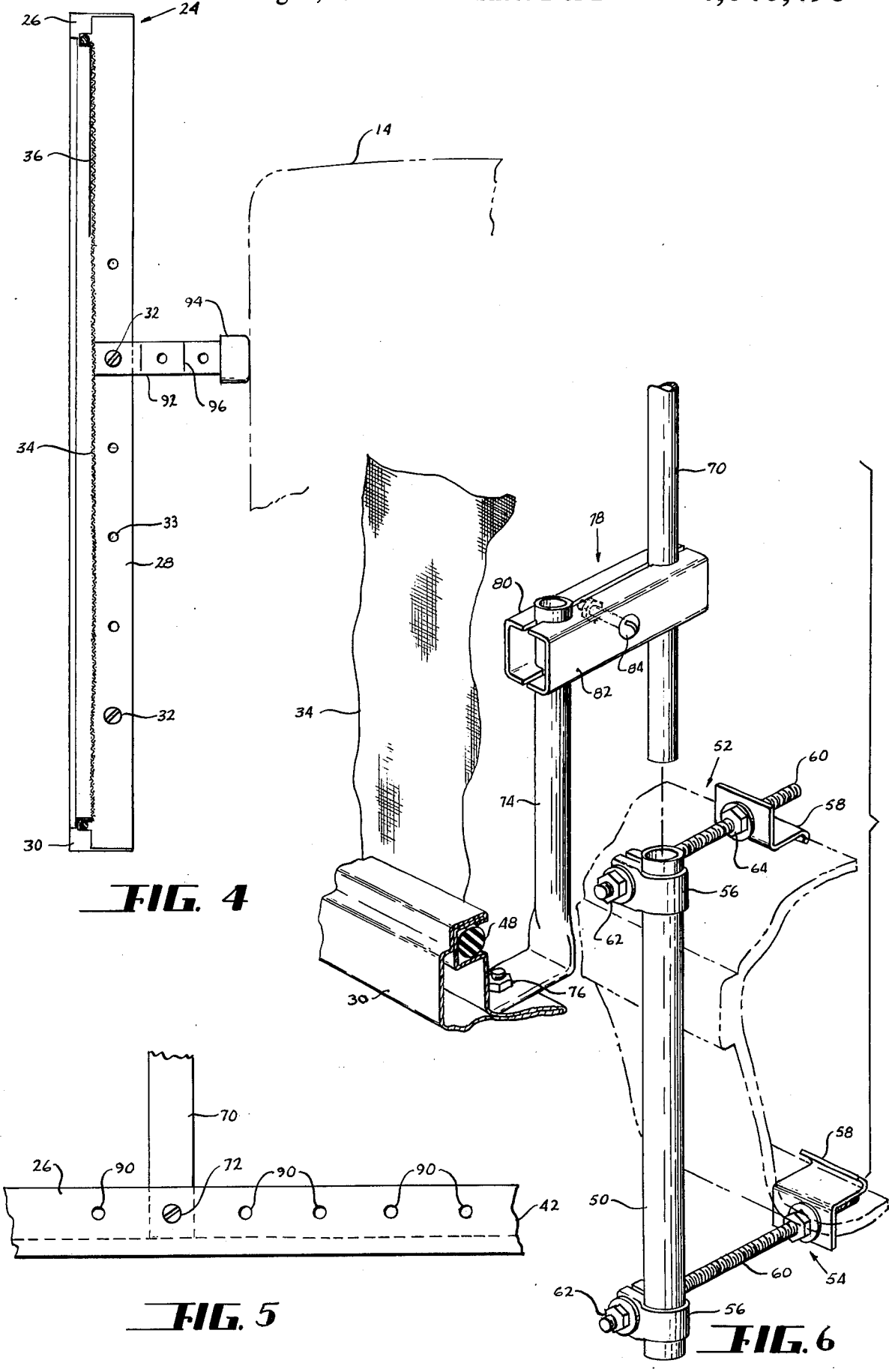

INSECT SHIELD ASSEMBLY

BACKGROUND OF THE INVENTION

The present invention relates to an insect shield assembly for a vehicle and, more particularly, to an insect shield assembly with screen means and deflector means for shielding the entire front of a vehicle from insects and other highway debris.

Insect shields are normally used for a few weeks each year in various areas of the country which experience a severe insect problem. During periods of use, the shield may be frequently removed for security purposes or for cleaning the shield or the vehicle on which it is mounted. During periods in which a shield is not needed, it will typically be stored. Accordingly, an insect shield should be of a simple, inexpensive construction which is easily mountable and removable and easily disassembled or "knocked down" for storage.

Various insect shield designs have been proposed which include shields having screen members to catch insects and thus prevent them from striking the front end of a vehicle and windshield deflectors mounted above the screen members which deflect the air impinging thereon and direct it above and away from the vehicle windshield, carrying insects and debris over the vehicle. The known deflectors are made from solid plastic plates which must be machined to size and to interfit with mounting hardware and, accordingly, are relatively expensive to manufacture. Some deflectors must be custom manufactured for various automobile makes and models and are especially costly to produce. The mounting hardware is also relatively expensive, partly because the hardware must be sufficiently strong not to collapse under the wind forces created by a high speed vehicle.

SUMMARY OF THE INVENTION

This invention provides a simple, inexpensive insect shield assembly which is easily mounted on and removed from a vehicle. In its preferred form, the shield assembly is readily disassembled into sub-assemblies. The assembly includes a lightweight shield made from two panels removably interconnected along adjacent sides and which, when connected together, will span substantially the entire front of most production passenger cars.

Each panel includes a framed piece of mesh screening and a strip of inexpensive, flexible, transparent plastic film or sheet along the upper portion thereof in overlying relation to the front face of the screening. Accordingly, when the panels are mounted on a moving vehicle, air moving relative to the vehicle will be deflected by the strips. The strips are blown against the screening from which the strips derive support against rearward deflection.

The plastic strips are preferably affixed to the panel frames by the same means which retains the screening on the frames. Those familiar with the construction of framed window screens will appreciate that several frame constructions could be used for this purpose. As illustrated herein, the preferred panel includes a rectangular array of frame sections having a peripheral spline groove into which the edges of the screening and the top and side edges of a plastic strip are rolled. A spline forced into the groove firmly holds the associated screening and strip in place. This construction is significantly cheaper than previously proposed screens with deflectors because plastic film or sheet is cheaper than machined plastic plates and because the hardware necessary for attaching deflector plates to the screens is entirely eliminated.

Further in accordance with this invention, mounting members are provided which may be mounted on the front bumper of a vehicle using simple tools. The mounting members slidably receive brace constructions affixed to each panel. Accordingly, one person can easily remove the lightweight shield from the mounting members by simply lifting it up and just as easily mount the shield simply by sliding it down into engagement with the mounting members.

There are preferably two mounting members, one on each side of a vehicle front bumper. There are, accordingly, two brace constructions, one for each panel, which add rigidity to the frame construction. Each assembled panel is desirably formed as a single component part of the entire shield assembly. All other parts of the assembly are readily detachable and the two panels are also readily detachable from one another. Accordingly, a shield assembly of this invention may be shipped knocked down in suitably small boxes and readily separated into sub-assemblies for storage.

BRIEF DESCRIPTION OF THE DRAWINGS

FIG. 1 is a perspective view of an insect shield assembly in accordance with the present invention attached to a vehicle illustrated in phantom.

FIG. 2 is a vertical sectional view of the insect shield assembly of FIG. 1 taken along the line 2—2 of FIG. 1.

FIG. 3 is an enlarged sectional view of a portion of the insect shield assembly enclosed within arcuate line 3 of FIG. 2.

FIG. 4 is a sectional view of the insect shield taken along the line 4—4 of FIG. 1.

FIG. 5 is a fragmentary plan view of the insect shield taken along the line 5—5 of FIG. 1.

FIG. 6 is an enlarged, exploded perspective view of a portion of the insect assembly of FIG. 1 illustrating the manner of attachment to a vehicle.

DESCRIPTION OF THE PREFERRED EMBODIMENT

Turning now to the drawings, FIG. 1 shows an insect shield assembly 10 manufactured in accordance with this invention mounted on the front bumper 12 of a vehicle 14. The shield assembly 10 includes a shield, generally designated 16, having parts to be described below interfitting with mounting members, generally designated 18 and 20, removably secured to the bumper 12.

The shield 16 is comprised of two substantially identical rectangular panels 22 and 24, each having a frame consisting of a top frame section 26, opposed side frame sections 28, and a bottom frame section 30. The frame sections are interconnected in any suitable fashion, such as by corner locks (not shown), the frames of the panels 22 and 24 being conventional window screen frames. Adjacent side sections 28 of the two panels 22 and 24 are detachably connected as by threaded fasteners 32 (see FIG. 4) which extend through selected aligned apertures 33 in the adjacent side sections 28 so that the respective frame top sections 26 and bottom sections 30 are coplanar. The assembled panels 22 and 24 have a width sufficient to span the entire front of most production passenger cars.

The frame sections 26, 28 and 30 peripherally surround and support pieces of mesh screening 34 which may be made of any suitable material and mesh effective to prevent small insects blown against the screening from passing therethrough. An acceptable screening has an 18 × 16 mesh made from 11 mil aluminum screen wire.

Further in accordance with this invention, each panel 22 and 24 supports a strip 36 of air-impervious, flexible, and transparent plastic film or sheet. Such material is commercially available in roll form and can quickly and inexpensively be cut to size. A wide variety of materials are available, an example being sheet sold under the trademark "FLEX-O-GLASS" by Warp Brothers of Chicago, Ill. The thickness or type of plastic film or sheet from which the strips 36 are manufactured is not critical provided that it is transparent, sufficiently flexible to be mounted on a frame, and sufficiently thick that it will not be torn by swirls or updrafts of air created when vehicles pass from the opposite direction under high speed driving conditions. Film having a thickness of approximately six mils is adequate. Preferably the film or sheet is of a type which is resistant to deterioration under sunlight.

It has been found that the plastic strips 36 provide an inexpensive and efficient deflector when the upper and side margins thereof are affixed to the frames overlying the front face of the screening 34. Although it may be thought that the unsupported bottom margins of the strips 36 would be deformed by the movement of air relative to the vehicle on which a shield 16 is mounted, it has been found that the wind pressure against the strips 36 merely flattens them out against the screening 34. Thus the screening 34, in effect, supports the strips 36 against rearward deflection while the vehicle is moving.

The panels 22 and 24 could be manufactured in a variety of ways. In general, any framed window screen of suitable dimensions would be acceptable provided that the framing has sufficient strength and rigidity to resist distortion caused by the pressure of air moving relative thereto. Conventional screen constructions are preferred because a variety of lightweight, inexpensive, mass-produced screens are commercially available. The presently preferred frame sections are seamed aluminum tubes or box sections having spline grooves. Such sections are strong and lightweight. With reference to FIG. 3, the frame section 26 is manufactured from a single strip of aluminum stock to form a box-like portion 40, a rearwardly extending flat flange or lip 42 formed from two wall thicknesses of the stock, and a rearwardly opening spline groove 44. The outside overlapping portion of the stock terminates in a stock edge 46 extending along the open end of the spline groove 44. Frame sections 28 and 30 are identically constructed to frame section 26, as shown, for example, in the enlarged view of the lower frame section 30 illustrated in FIG. 6. The spline grooves of the frame sections 26, 28 and 30 forming the framing for each of the panels 22 and 24 are connected so that the groove 44 may be considered to be a continuous groove extending peripherally around its associated piece of screening.

In assembly of a panel of this invention, the edges of the screening are rolled into the peripheral spline groove 44 and a spline 48, which may be made from aluminum or, as illustrated, a vinyl plastic, is wedged into the groove to hold the edges of the screening in place. This is conventional practice. In addition, the side and top edges of a strip 36 are rolled with the screening into the spline groove 44 along the upper portions of the side frame sections 28 and entirely along the top frame section 26. Therefore, when the spline 48 is rolled into the groove 44, the top and side margins of the strip 36 will be wedged between the edges of the screening 34 and the surfaces of the groove 44. When panels are assembled as shown in FIG. 3, the screening 34 and the strips 36 are firmly retained by the splines 48, the splines 48 being forced into the grooves 44 and locked therein by the projecting stock edges such as the edge 46.

A shield having panels 22 and 24 constructed as described above has been tested under various conditions. It has been found that the screening 34 protects the vehicle grill, radiator, and headlights from insects, and the plastic strips 36 deflect the air around and over the vehicle so that few insects strike the windshield.

The mounting members 18 and 20 are of mutually identical construction. With reference to FIGS. 2 and 6, the mounting member 20 comprises a vertical, hollow mounting tube 50 removably attached to the front bumper 12 by upper and lower bracket assemblies 52 and 54, respectively, each comprising a C-clamp 56 gripping the tube 50 and a bumper-engaging hook or clip 58. The clamps 56 and the hooks or clips 58 have aligned apertures receiving threaded shafts or bolts 60, the spacing between the clamps 56 and the hooks or clips 58 being adjustably fixed by nuts 62 straddling the clamps 56 and nuts 64 straddling the apertured portion of the hooks or clips 58. It is believed apparent that one could, with a simple plier or wrench, quickly and easily mount the mounting member 20 on a vehicle bumper. The member 20 may similarly be easily removed. Since the mounting member 18 is identically constructed to the mounting member 20, it is not described in detail herein.

The mounting tubes 50 are adapted to slidably receive the lower ends of smaller diameter, vertically extending first support or brace tubes 70, the upper portions of which are bent into an L-shape and have flattened ends. The flattened ends are connected to the flanges 42 of the respective upper frame sections 26 by bolt and nut assemblies 72. The panels 22 and 24 have vertically extending second support or brace tubes 74, the lower ends of which are flattened and bent at right angles and connected to the flanges 42 of the lower frame sections 30 by bolt and nut assemblies 76. Each first brace tube 70 is mounted in parallel aligned relation to the second brace tube 74 connected to the same panel. The first and second brace tubes 70 and 74 of each panel are rigidly interconnected by a clamp assembly 78. Each assembly 78 comprises a pair of channel members 80 and 82, the legs of which have pairs of confronting arcuate notches so that channel members 80 and 82 may be drawn together by a bolt and nut assembly 84 to firmly grip both tubes 70 and 74. As may be apparent, the bottom surface of the clamp assembly 78 surrounding the first brace tube 70 rests on top of the mounting tubes 50 and thus the tubes 50 provide support for the entire shield 16. Since the lower ends of the first brace tubes 70 are telescopically received within the mounting tubes 50, the shield 16 is held in a vertical position when it is mounted on the mounting members 18 and 20.

When assembling the apparatus of this invention, the mounting members 18 and 20 are first loosely mounted on opposite sides of the front bumper 12 as described above. The first and second brace tubes 70 and 74 may then be connected to their corresponding flanges 42 by the bolt and nut assemblies 72 and 76. With reference to FIG. 5, the upper frame sections 26 are provided with a series of aligned apertures 90 for receiving the bolt and nut assembly 72. The flange portion 42 of the lower frame section 30 is provided with an identical set of apertures (not shown) vertically aligned with the apertures 90 for receiving the bolt and nut assembly 76. By suitably selected the aligned apertures in the flanges 42 to which the brace tubes 70 and 74 may be connected, the mounting members 18 and 20 can then be adjusted to be aligned with the first brace tubes 70 and the bracket assemblies 52 and 54 adjusted to firmly support the mounting tubes 50. The shield assembly 10 is thereby ready for use. In view of its lightweight construction and the simple method of mounting of the shield 16, it may easily be removed from the mounting members 18 and 20 simply by lifting it to remove the lower ends of the first brace tubes 70 from the mounting tubes 50.

Vertical adjustment of the shield 16 relative to the vehicle would rarely be necessary because most production vehicles have a height between the bumper and the top of the hood falling within a range which enables a preadjustment for practically all cars. However, vertical adjustment may be obtained by adjusting the position of the C-clamps 56 relative to the mounting tubes 50 and also adjustment of the clamp assembly 78 relative to the first brace tubes 70 and the second brace tubes 74. In general, the shield 16 is preferably so mounted that the exposed portions of the screening cover the vehicle grill and headlights, and the flexible plastic strips 36 extend from a level slightly below the top front of the vehicle hood to a few inches above the hood.

It is to be noted that the assembly of the first brace tubes 70, the second brace tubes 74 and the clamp assembly 78 interconnecting them, all of which are connected to the upper and lower frame sections 26 and 30, provide a stiffening member or brace for the associated panel. It has been found that these assemblies have the optimum bracing effect if they are spaced by at least one-third the width of each panel from both opposed side frame sections 28 of each panel but they can be closer to the outboard sides of the panels. Accordingly, the apertures 90 of both panels and the corresponding apertures in the lower frame sections 30 thereof are located within this range so that one purchasing the shield assembly would be led to the proper position of the brace tubes 70 and 74. To insure a relatively rigid mount for the shield 16, the flattened ends of the first brace tubes 70 and the second brace tubes 74 are squared off and substantially in abutment with the adjacent surfaces of the frame sections so as to prevent rotation of the brace tubes relative to their fasteners 72 and 76. Such relationship of parts is shown in FIGS. 2 and 5.

Using the panels of this invention interconnected and mounted as described above, it has been found that they are sufficiently stiff to resist deformation and deflection against the sides of the vehicles on which they are mounted. However, since the shield has a relatively large unsupported midsection, the center of the shield may, under high speeds, tend to collapse against the front of the vehicle. Accordingly, a spacer 92 is preferably connected to the interconnected frame sections 28 at the middle of the shield 16. The spacer 92 may comprise a rectangular piece of flat stock apertured to receive one of the fasteners 32 which connects the contiguous side frame sections 28. The other, free end of the spacer 92 may be provided with a rubber or plastic cap or cushion 94 adapted to engage the hood of the vehicle 14 without marring its finish. Preferably the end of the spacer 92 closest to the frame section 28 is mounted as close as possible thereto so as to prevent it from pivoting about its fastener 32. The stock from which the spacer 92 is formed desirably has spaced transverse notches 96 to provide weakened lines so that it can be broken apart to leave a length appropriate for the vehicle on which the assembly 10 is mounted. Several apertures 33 are provided in the adjacent frame side sections 28 so that the vertical height of the spacer 92 may be selected to correspond to the portion of the vehicle to be engaged thereby.

As should be apparent, the shield assembly of this invention is lightweight, simple and inexpensive. For shipping purposes, it can be shipped entirely disassembled except for the preassembled panels 22 and 24. When not in use, the shield assembly 10 can conveniently be stored in four sub-assemblies, namely, the two panels 22 and 24 with connected support tubes 70 and 74, and the two mounting members 18 and 20. The spacer 92 can be connected to one of the panels for storage.

A lock or keeper mechanism (not shown) could be provided which would project through aligned apertures in the bottoms of the first brace tubes 70 and the mounting tubes 50 for purposes of theft prevention. However, such devices are otherwise deemed unnecessary because there is no noticeable tendency for the shield 16 to lift off the mounting tubes 50 when mounted on a moving vehicle.

Although the exact dimensions of the shield 16 are not critical, a shield having a width (i.e. horizontal dimension) of 72 inches and a height of 22 inches is satisfactory for most full-size and intermediate-size American made cars. In such case, each panel 22 and 24 would have a horizontal extent of 36 inches. The apertures 90 are preferably located at least 18 inches from the inboard side of each panel. The strips 36 are approximately six inches wide and preferably extend about two inches below and four inches above the level of the top front of the vehicle hood. Smaller shield assemblies may be used for compact and sub-compact car models.

Although the presently preferred embodiment of this invention has been described, it will be understood that within the purview of this invention various changes may be made within the scope of the appended claims.

We claim:

1. An insect shield assembly comprising:
a shield including a peripheral frame structure having an upper portion and a lower portion; and
means for removably mounting said shield on a vehicle, said means comprising:
a pair of mounting members, means for removably mounting said mounting members on the front of a vehicle, said mounting members when mounted on the front of the vehicle having generally vertically extending parts projecting above said means for removably mounting them on a vehicle; and
a pair of brace means, one for each mounting member, each of said brace means comprising a first generally vertical brace member connected to said upper portion of said frame structure,
a second generally vertical brace member connected to said lower portion of said frame structure, said brace memers having adjacent, offset end portions, and clamp means interconnecting said end portions, the lowermost ends of said first brace members being telescopically interengaged with said generally vertically extending parts for orienting said shield in a generally vertical position in front of the vehicle, said clamp means having surfaces engaging said mounting members to limit the length of interengagement of said first brace members and said generally vertically extending parts and to provide support for said shield, so that said shield and said brace means may be mounted on and removed from the vehicle as a single unit.

2. An insect shield assembly comprising:

a shield including a pair of generally rectangular panels, each comprising a peripheral frame structure having an upper portion and a lower portion, screening mounted on said frame structure, and deflector means formed from a strip of transparent, flexible plastic mounted on said frame structure in overlying relation to an upper portion of said screening; and means for removably mounting said shield on a vehicle comprising:

a pair of mounting members, means for removably mounting said mounting members on the front of a vehicle, said mounting members when mounted on the front of the vehicle having a generally vertically extending parts projecting above said means for removably mounting them on a vehicle, and a pair of brace means, one for each mounting member and each frame structure, each of said brace means comprising:

a first generally vertical brace member connected to said upper portion of one of said frame structures, a second generally vertical brace member connected to said lower portion of said one of said frame structures, and means interconnecting said first and second brace members, the lowermost ends of said first brace members being telescopically interengaged with said generally vertically extending parts for orienting said shield in a generally vertical position in front of the vehicle, said means interconnecting said first and second brace members and said mounting members having mutually engaging surface means which limit the length of interengagement of said telescopically mounted parts and said generally vertically extending parts to thereby provide support for said shield, so that said shield and said brace means may be mounted on and removed from the vehicle as a single unit.

3. The assembly of claim 2 further including means detachably connecting said panels together along side edges thereof, the combined horizontal extent of said panels being sufficient to span substantially the entire front of most production passenger cars.

4. The assembly of claim 2 wherein said frame structure comprises plural interconnected projected box sections, each said frame structure having a peripheral spline groove, and wherein spline means retains edges of said screening and said strip thereof within said groove.

5. An insect shield assembly comprising:

a shield including a peripheral frame structure having an upper portion and a lower portion, mesh screening, and a strip of transparent, flexible plastic overlying and in front of an upper portion of said screening and deriving support from said screening against rearward deflection; and means for removably mounting said shield on a vehicle, said means comprising:

a pair of mounting members, means for removably mounting said mounting members on the front of a vehicle, said mounting members when mounted on the front of the vehicle having generally vertically extending parts projecting above said means for removably mounting them on a vehicle, and a pair of brace means, one for each mounting member, each of said brace means comprising a first generally vertical brace member connected to said upper portion of said frame structure, a second generally vertical brace member connected to said lower portion of said frame structure, and means interconnecting said first and second brace members, the lowermost ends of said first brace members being telescopically interengaged with said generally vertically extending parts for orienting said shield in a generally vertical position in front of the vehicle, said means interconnecting said first and second brace members and said mounting members having mutually engaging surface means which limit the length of interengagement of said telescopically mounted parts and said generally vertically extending parts to thereby provide support for said shield, so that said shield and said brace means may be mounted on and removed from the vehicle as a single unit.

6. In an insect shield of the type adapted to be mounted on the front of a vehicle and having a frame structure, mesh screening spanning a portion of the front of the vehicle, and an air deflector for directing insects away from the vehicle, the improvement wherein said deflector comprises a strip of flexible, transparent plastic film or sheet overlying an upper portion of said screening having an area substantially coextensive to the area of said strip, said strip being positioned in front of said screening so that it lies against and derives support against rearward deflection from said screening when the vehicle is moving in a forward direction, said frame structure having a peripheral spline groove, the edges of said screening being located in said groove, said strip having top and side edges located in said groove, and a spline in said groove for retaining said edges of said screening and said strip in said groove.

* * * * *

UNITED STATES PATENT OFFICE
CERTIFICATE OF CORRECTION

PATENT NO. : 4,040,498
DATED : August 9, 1977
INVENTOR(S) : James B. Johnson and Jesse L. Henson It is certified that error appears in the above-identified patent and that said Letters Patent are hereby corrected as shown below:

Col. 5, line 8, "selected" should be ---selecting---.
Col. 7, line 1, "memers" should be ---members---.
Col. 7, line 29, after "having" delete ---a---.
Col. 7, line 60, after "wherein" insert ---each---.

Signed and Sealed this

Fourteenth Day of March 1978

[SEAL]

Attest:

RUTH C. MASON
Attesting Officer

LUTRELLE F. PARKER
Acting Commissioner of Patents and Trademarks